United States Patent
Cline et al.

(10) Patent No.: US 7,136,908 B2
(45) Date of Patent: Nov. 14, 2006

(54) EXTENSIBLE NETWORK SERVICES SYSTEM

(75) Inventors: Linda S. Cline, Forest Grove, OR (US); Satyendra Yadav, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 899 days.

(21) Appl. No.: 09/772,518

(22) Filed: Jan. 29, 2001

(65) Prior Publication Data

US 2002/0103720 A1    Aug. 1, 2002

(51) Int. Cl.
*G06F 7/50*    (2006.01)
(52) U.S. Cl. ........................................ 709/220; 707/10
(58) Field of Classification Search ........ 709/200–229; 707/10
See application file for complete search history.

(56) References Cited

U.S. PATENT DOCUMENTS

| | | | |
|---|---|---|---|
| 6,366,916 B1 * | 4/2002 | Baer et al. ..................... | 707/10 |
| 6,480,955 B1 * | 11/2002 | DeKoning et al. .......... | 713/100 |
| 6,757,729 B1 * | 6/2004 | Devarakonda et al. ...... | 709/226 |
| 6,895,431 B1 * | 5/2005 | Bero .......................... | 709/220 |
| 7,043,537 B1 * | 5/2006 | Pratt .......................... | 709/220 |
| 2001/0002473 A1 * | 5/2001 | Waldo et al. ................ | 709/229 |
| 2002/0129126 A1 * | 9/2002 | Chu et al. .................... | 709/220 |

FOREIGN PATENT DOCUMENTS

EP    1569103    * 8/2005

OTHER PUBLICATIONS

Perkins, Kathy, Cross the intergration chasm, Computing Canada, Nov. 21, 1996.*
Business Wire, Chevy Chase bank deploys command MQ bonuspac; Boole & Babbage Web-based offering makes it quick and easy for bank to configure and manage MQSeries message-Queing middleware, Sep. 8, 1998.*

* cited by examiner

*Primary Examiner*—Mark Fadok
(74) *Attorney, Agent, or Firm*—Fish & Richardson P.C.

(57) ABSTRACT

Automatically finding and using network services. An extensible framework is defined which allows any network service, new or old, to be defined. A base schema is defined that defines existing network services, and extension schemes may also be defined which are specific to new network services. A vendor can define the schemas in XML, as well as using software plug-ins and configuration data. The information is stored on a network provider's server. Clients can browse the network providers server for available services. Any available services can be accepted. When this happens, a form is provided to the client; the client fills out the form; and returns it. The information on the form is associated with the XML schemas and used to select and automatically configure the network service.

14 Claims, 2 Drawing Sheets

EXTENSIBLE NETWORK SERVICES SYSTEM

BACKGROUND

A network is formed by any two computers or processors which are connected by an information line. A provider of network services is often called a service provider. A specialized kind of service provider is an Internet service provider or ISP. More generally, however, an xSP may be a provider of an unspecified type of network services to users.

Many service providers provide simple bandwidth. However, there has been a demand for these providers to provide more advanced services such as virtual private networking, voice over IP (Internet Protocol), IDS (Intrusion Detection Systems), and quality of service systems. Many of these services, and other similar services which can be provided over a network, are generically referred to as network services.

E-commerce transactions and sales often define sale items using extensible markup language or XML. XML can provide a way to describe the common characteristics of goods. The goods may be generically described using their common elements such as price, product description, number of goods in inventory, source, item numbers and other information.

Certain network services are available for purchase online. Often, the purchase may either include a line of services from a single vendor, or a single type of network service such as bandwidth. The single type of network service may be offered from different vendors at common locations using a common description. However, new and emerging network services may not be susceptible of description over that common schema.

BRIEF DESCRIPTION OF THE DRAWINGS

These and other aspects will now be described in detail with reference to the accompanying drawings, wherein.

DETAILED DESCRIPTION

The present application describes a system for describing, configuring and selling advanced network services. These services can be dynamically deployed, discovered and used by customers.

The system and method described herein includes defining the service, using common elements with other existing services, and unique elements which may be for this service only, or for multiple services. The defined service is posted on a service directory, and found by a searching client.

XML may be used to create a language for describing advanced network services and extensions for services. The present system teaches using dynamically defined documents. The documents can be defined in terms of tags and data associated with the tags. In a specific mode, the tags and documents are formed in XML, and XML schema is used to dynamically add newly developed services. Any service can be defined using this schema, since the newly developed services can be defined as newly defined documents.

Figure 1:
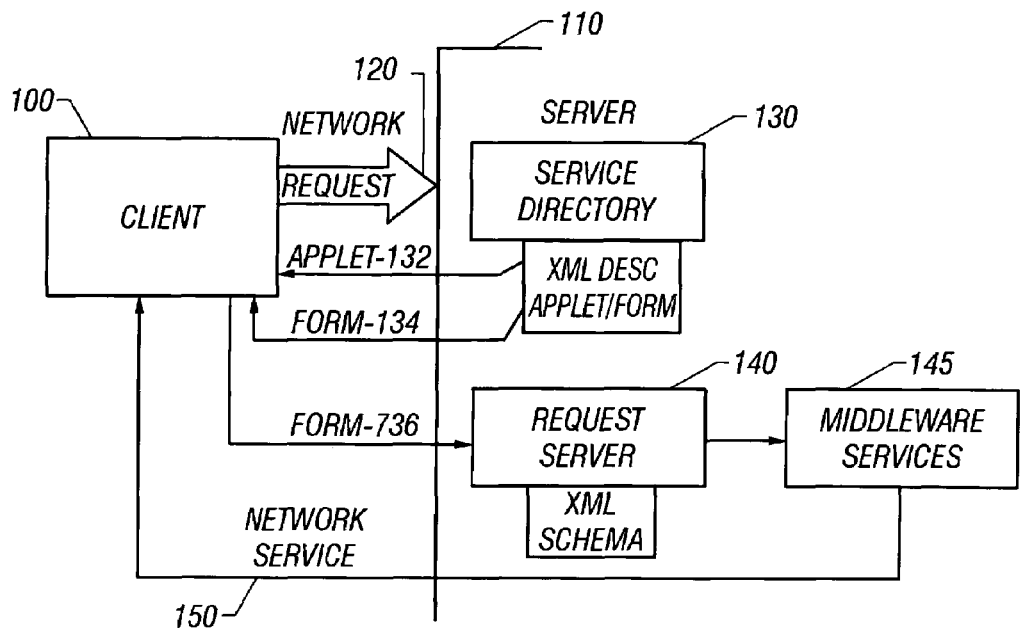
FIG. 1 shows a block diagram of a network configured to discover, configure and provide network services.

A basic block diagram of the system is shown in FIG. 1. A client on a network 100 is connected to a server 110 over a network Channel 120. The channel can be any existing form of network. A client may make network requests and receive responses from the server and any other services associated with the server or designated by the server.

The server, and other information storage elements that are associated with the server, stores information about the network services. FIG. 1 shows the basic architecture, but need not actually be in the server.

A service directory 130 stores service information that is described in a specified form. The service information describes the network services. The information can include base information, describing common information to multiple services, and extended information which can further describe the specific services.

The information needs to be sufficient to allow the client 100 to identify those services it is interested in and initiate a service request. As described herein, the initiation of service request will also include information that allows the service to be automatically configured. The available services are described in the directory, formed of service descriptions which are XML documents. The services that are available from a particular server may be registered within the service directly by the vendor, or gathered automatically by the service which can search publically available sources. This schema, using XML schema notation, may be used to create the service description.

A client may identify a desired service within the server. The client indicates the desirability of the service to the server. The client may need an interface routine in order to interact with the framework and provide necessary information. Therefore, each XML description may include an applet associated with the description. The applet is downloaded at 132. The alternative to an applet could include a form 134 that is presented to the client 100, and allows the client to fill out specified required data for the identified service. The applet may also provide an interaction environment with the server that will be used for contract negotiation for the service as well as an authentication of the client for the service. Purchases of services may also be accomplished in an automated way, and may not specifically require filling out the form manually on the client.

The form sent at 134 is filled out on the client, either automatically or manually, and returned at 136. The returned form is sent to the request server 140 which processes the information in the form, and initiates services responsive to the information in the form. Service requests and responses are written using multiple XML schema documents. The information within the documents may include a base schema with a common service vocabulary that represents common elements of the specified services. The specific services are also described within an extension schema that includes additional elements required for that service. In addition, an XML stylesheet language transform or XSLT document may be defined to describe the transformation between the service elements and an application programming interface (API) required by the service developer or vendor. Those results may be sent to a middleware service provider shown as 145.

Either the middleware service provider or the requests server itself may return status and information about the specified network service to the client at 150.

The service's middleware components accept the requests from the client, and direct them to a service developer or vendor provided service. This may use plug-ins, for example. The services may have their own defined APIs for the specific services in the middleware based on the target of the XSLT transformation. Moreover, the network element may support standard network APIs.

Figure 2:
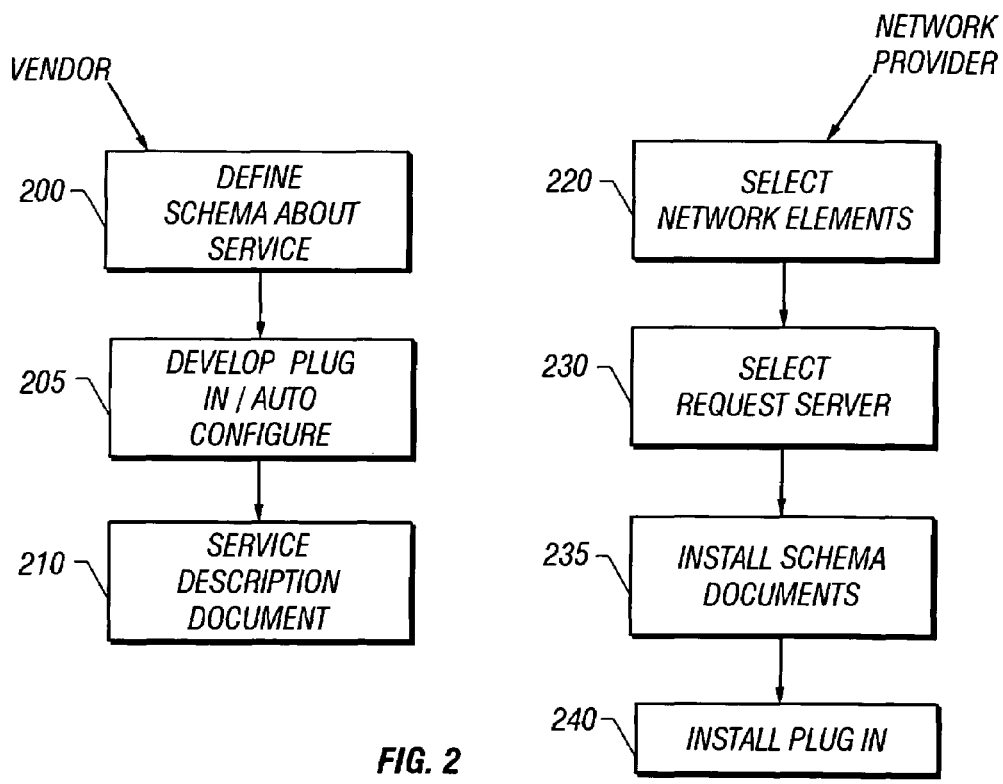
FIG. 2 shows a flowchart of creating network services, and registering the network services.

The basic architecture shown in FIG. 1 may be used according to the flowcharts of the specific embodiments given herein. FIG. 2 shows a flowchart that may be carried out when the vendor wishes to develop a network service of any type. The procedure in FIG. 2 is as follows. At 200, the vendor defines one or more service XML extension schemas which define unique information about the service. The service XML schemas include the information that is not covered by the service base XML schemas that define common information about network services. The schemas accommodate all service information and service responses as well as the service requests associated therewith.

At 205, the vendor develops a service software plug-in for the middleware layer 140 that forms the processing for the service. The vendor also defines an XSLT document that describes the transform between the service documents and the service middleware plug-in API. These components may be used to automatically configure the network service in the middleware.

At 210, the vendor creates a service description document to store at a service directory. The service description document may include an extension schema, and may include an XML stylesheet transform document if the vendor will be providing more than just basic information contained in the base schema for the service description. The vendor may also describe a client side applet which may be used to elicit additional specific service data upon service enactment. After 210, the vendor's portion of the framework may be completed.

A network provider, such as an xSP, may wish to offer the vendor's services. This is carried out as follows. At 220, one or more network elements are selected to provision the service. A service description document and possibly client applets for the service are provided to the service directory 130. A service request server is selected at 230 to handle the management of the service. This is registered as the handler for the service with the service directory 130.

At 235, the service extension schema documents (from 200) are installed at the service request server 140. The middleware server 145 is registered with the service request server 140 as the plug-in handler for the specified service. Then, the plug-in (from 205) is installed at the middleware server at 240, and network elements are registered for the plug-in to utilize the service.

Figure 3:
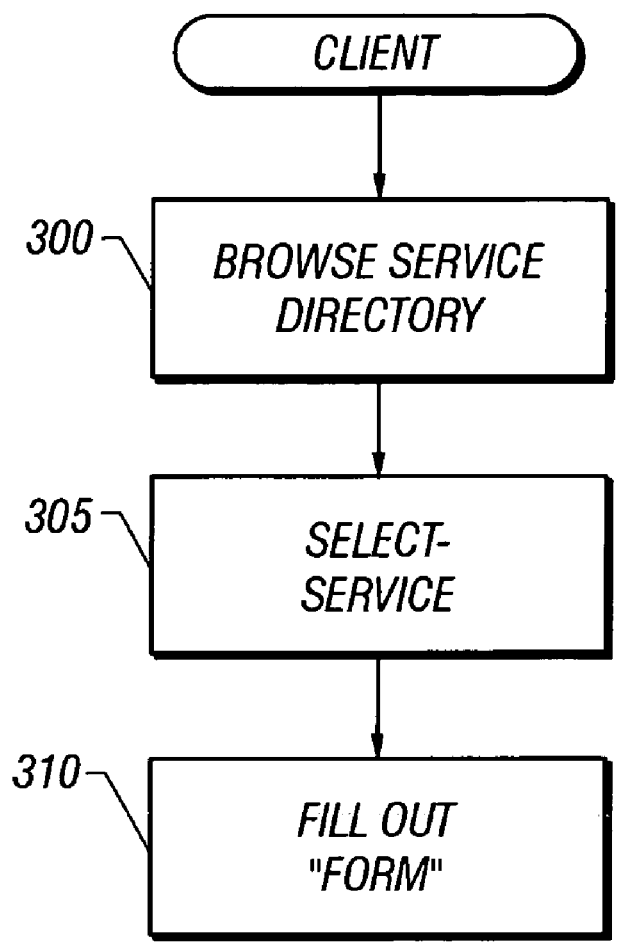
FIG. 3 shows a flowchart of how a client discovers and uses network services.

FIG. 3 shows that scenario when a customer or client wishes to purchase a service. At 300, the client first browses a service directory 130 to determine available services, or uses some kind of search engine to search for the desired services. The user selects one of the services from among the service directory at 305. The client then chooses to initiate that service, and a form is returned. The client fills out the "form" at 310, which may include any technique of providing the information that is used to automatically configure the service. The rate for the service may also be determined, e.g., by contract negotiation.

At 315, the client submits the final information. This information is converted into XML documents based on each field in the form being related to an XML-tag. The XML documents as created conform to the request schema as defined by the vendor at 200.

These documents are then processed by the service requester and transformed into requests directed to the middleware plug-in 145. The middleware plug-in processes the requests and programs network elements or other resources to set up the service at 320. This may include use of another supporting service discovered through the service directory, which can be utilized in a automated way, with XML requests sent by the middleware plug-in, in which case the middleware plug-in becomes the client of another service.

Any responses may be propagated back to the client. The client may make subsequent interactive requests as well. These take the form of service requests and response documents between the client and the framework. This mechanism also allows the framework to be used to get services with arbitrary requirements and attributes.

Any service can be defined in terms of new XML tags. The base XML schemas define common parts of the network elements. The extension XML schemas can be used to define anything, including new or old parts of the network elements.

This provides a way for a client to discover available network services on demand using standard web tools such as browsers and XML processors.

The system described herein may be used for different network services including, but not limited to, bandwidth reservation, voice over IP, firewalls and other intrusion detection software, server load balancing, and the like.

Although only a few embodiments have been disclosed in detail above, other modifications are possible. All such modifications are intended to be encompassed within the following claims.

What is claimed is:

1. A network system, comprising:
   a service directory, storing information about a plurality of different network services;, each network service in said service directory defined by a document that describes the network service, and each network service including a downloadable service item which allows a client to provide information about the client that will be used to configure said each said network service; and
   a service request server, accepting a service request from a client including said service item from said client, and which carries out an operation on said service based on said service item.

2. A system as in claim 1, wherein said document is formed in terms of specified tags and data associated with said specified tags.

3. A system as in claim 2, wherein said document is in XML.

4. A system as in claim 1, wherein said document includes a first portion which defines common elements of network services, and a second portion which defines extensions to said first portion.

5. A system as in claim 4, wherein said first and second portions are defined in terms of tagged documents including tag information and data associated with said tag information.

6. A system as in claim 5, wherein said tagged documents are XML documents, said tag information being XML tags.

7. A system as in claim 1, wherein the service item provides a form to the client to obtain information about configuration of the network service from the client.

8. A system as in claim 7, wherein said service request server converts the information from the form into XML information.

9. A system as in claim 1, wherein the service item provides an applet to the client to obtain information about configuration of the network service from the client.

10. A system as in claim 9, wherein said service request server converts the information from the applet into XML information.

11. An apparatus comprising:

means for storing information about a plurality of different network services, each network service in said means for storing information defined by a document that describes the network service, and each network service including a downloadable service item which allows a client to provide information about the client that will be used to configure said each said network service; and a service request server, accepting a service request from a client including said service item from said client, and which carries out an operation on said service based on said service item.

12. An apparatus comprising:

a service directory, storing information about a plurality of different network services, each network service in said service directory defined by a document that describes the network service, and each network service including a downloadable service item which allows a client to provide information about the client that will be used to configure said each said network service; and means for accepting a service request from a client including said service item from said client and means for carrying out an operation on said service based on said service item.

13. A network system, comprising:

a service directory, storing information about a plurality of different network services, each network service in said service directory defined by a document that describes the network service, and each network service including downloadable interface means which allows a client to provide information about the client that will be used to configure said each said network service; and a service request server, accepting a service request from a client including said downloadable interface means with client information from said client, and which carries out an operation on said service based on said service item.

14. A network system, comprising:

a service directory, storing information about a plurality of different network services, each network service in said service directory defined by a document that describes the network service, and each network service including means for presenting a form which allows a client to provide information about the client that will be used to configure said each said network service; and a service request server, accepting a service request from a client including said means for presenting a form with client information from said client, and which carries out an operation on said service based on said service item.

* * * * *